(12) United States Patent
Calefati

(10) Patent No.: US 8,558,135 B2
(45) Date of Patent: *Oct. 15, 2013

(54) METHOD FOR MONITORING THE QUALITY OF LASER-MACHINING PROCESSES AND CORRESPONDING SYSTEM

(75) Inventor: Paolo Calefati, Collegno (IT)

(73) Assignee: Prima Industrie S.p.A., Collegno (TO) (IT)

( * ) Notice: Subject to any disclaimer, the term of this patent is extended or adjusted under 35 U.S.C. 154(b) by 264 days.

This patent is subject to a terminal disclaimer.

(21) Appl. No.: 13/022,779

(22) Filed: Feb. 8, 2011

(65) Prior Publication Data

US 2011/0192825 A1     Aug. 11, 2011

(30) Foreign Application Priority Data

Feb. 8, 2010   (IT) ............................... TO2010A0086

(51) Int. Cl.
| | | |
|---|---|---|
| B23K 26/00 | (2006.01) | |
| B23K 26/20 | (2006.01) | |
| B23K 26/38 | (2006.01) | |
| G05B 19/00 | (2006.01) | |
| G06T 1/00 | (2006.01) | |
| G06F 19/00 | (2011.01) | |

(52) U.S. Cl.
USPC ............ 219/121.62; 219/121.63; 219/121.67; 700/166; 706/904

(58) Field of Classification Search
USPC ........... 219/121.61–121.72, 121.83; 700/166; 706/904
See application file for complete search history.

(56) References Cited

U.S. PATENT DOCUMENTS

| | | | | |
|---|---|---|---|---|
| 4,663,513 A | * | 5/1987 | Webber ...................... | 219/121.6 |
| 6,084,223 A | * | 7/2000 | Dietz et al. .................... | 219/617 |
| 6,670,574 B1 | * | 12/2003 | Bates et al. ................... | 219/121.64 |
| 6,922,482 B1 | * | 7/2005 | Ben-Porath .................... | 382/149 |
| 6,940,038 B2 | * | 9/2005 | Biunno et al. ............ | 219/121.69 |
| 7,164,099 B2 | * | 1/2007 | Hata et al. ................ | 219/121.79 |
| 7,640,125 B2 | * | 12/2009 | D'Angelo et al. .............. | 702/81 |
| 8,212,175 B2 | * | 7/2012 | D'Angelo et al. ....... | 219/121.63 |

FOREIGN PATENT DOCUMENTS

| | | |
|---|---|---|
| EP | 1 767 308 | 3/2007 |
| JP | 63278686 A | * 11/1988 |
| WO | WO 99/14640 | 3/1999 |

OTHER PUBLICATIONS

IT Search Report for TO2010A000086 dated Sep. 15, 2010.
Written Opinion for TO2010A000086 dated Sep. 15, 2010.

* cited by examiner

*Primary Examiner* — Samuel M Heinrich
(74) *Attorney, Agent, or Firm* — Nixon & Vanderhye P.C.

(57) ABSTRACT

A method for monitoring the quality of laser-machining processes (500), in particular laser-cutting or laser-welding processes, including the operations of:
  acquiring via sensor means (540), in particular optical sensors, a machining-process signal (Xp) and calculating from said signal representing the process (Xp) parameters (E1, E2, DC) that represent the machining quality during the laser-machining process; and
  making available (130) corresponding reference parameters (E1r, E2r, DCr) representing a given machining quality, which are calculated from a process reference signal (Xr) acquired via said sensor means (540).
According to the invention said method further includes the operations of:
  comparing (230) said parameters (E1, E2, DC) representing the machining quality with said reference parameters (E1r, E2r, DCr) representing a given machining quality to obtain a set of regulated process parameters (N1, N2, NDC);
  making available (140) a plurality of statistical models ($\theta_k$) that identify respective states of the machining process (500), said states including states of defect (D); and
  executing in real time an operation of recognition (300) that a set of process observations (x; N1, N2, NDC, DIR) acquired in real time which includes said set of regulated process parameters (N1, N2, NDC) belongs to one or more of said plurality of statistical models ($\theta_k$) that identify states of the machining process (500), said recognition operation (300) including identification (330) of one or more causes of defect (D) as a function of the states recognized in said recognition operation.

31 Claims, 4 Drawing Sheets

METHOD FOR MONITORING THE QUALITY OF LASER-MACHINING PROCESSES AND CORRESPONDING SYSTEM

This application claims priority to Italian Patent Application No. TO2010A000086 filed 8 Feb. 2010, the entire content of which is hereby incorporated by reference.

The present invention relates to a method for monitoring the quality of laser-machining processes, in particular cutting or welding processes, and a corresponding system.

Real-time regulation of the technological parameters and maintenance of a constant machining quality during processes of cutting and welding, for example laser cutting and welding, but also machining processes such as cladding and thermal treatment, have a major impact on the industrial production and on the quality of the product. Smart machining carried out by cutting/welding machines enables optimization and certification of production as well as reduction of the waste.

It is known in this regard to carry out control of production and certification of the quality via operators or through the analysis of the workpieces by means of dedicated instrumentation operating off line. This entails drawbacks in so far as the production must in any case be monitored by an operator responsible for the machine, and correction of poor machining quality must be performed off line by stopping production and regulating the cutting/welding technological parameters empirically.

Likewise known are methods for monitoring the quality of cutting or welding that operate on line, during production, also using reference signals for the monitoring operation, but that do not allow correction of poor machining and real-time regulation of the technological parameters. Regulation and correction of the technological parameters is entrusted to the experience of the operator.

The present invention, which fits into said context, has the object of providing further improvements, and in particular of improving the precision of monitoring and enabling regulation and correction of the technological parameters on line, in real time, without human intervention.

According to the present invention, said object is achieved by a monitoring method having the characteristics that form the subject of the main claim and by a corresponding system. Further advantages are likewise obtained thanks to the characteristics of the dependent claims.

The present invention moreover regards a computer program product that can be directly loaded into the memory of a computer and comprises portions of software code for implementing the method when the product is run on a computer in order to increase precision. Preferred embodiments of said method are presented in the dependent claims.

The present invention will now be described in detail with reference to the attached drawings, which are provided purely by way of non-limiting example and in which.

In brief, the monitoring method according to the present invention operates to guarantee a constant quality of the laser-machining process, in particular laser cutting or welding, during industrial production, through the following operations:

real-time acquisition of a signal representing the quality of the machining process;

creation of a reference parameter (energy thresholds) indicating the desired machining quality;

real-time processing of the process signal;

identification of the machining quality and of a possible type of defect; and control of the machining process and correction of possible defects via real-time regulation of the technological parameters of the machining operation, in particular laser cutting or welding.

Maintenance of the desired quality during the machining process is hence based upon the analysis of signals representing the process quality referred to a given parameter obtained from a signal generated and acquired during machining of a standard or reference piece with a desired quality or in any case a predetermined quality.

The operations described above preferably comprise identification of the geometry of the workpiece and the quality of the process, which envisages identification, at the level of numeric control module of the machine, of the quality of machining, namely, of the cutting or welding operation, for each part machined. In other words, the numeric control module operates by taking into account how and when each given part of the workpiece is being machined—i.e., at what instant in time the quality is evaluated and what point of the machining path (e.g., cutting curve) corresponds to that instant. In particular, the machining direction is taken into account. Said association between the geometry of the workpiece and the quality of the process favours real-time identification of the cutting quality; namely, the operation of monitoring is performed for each given deterministic time and for a given deterministic space that the numeric control module controls.

Figure 1:
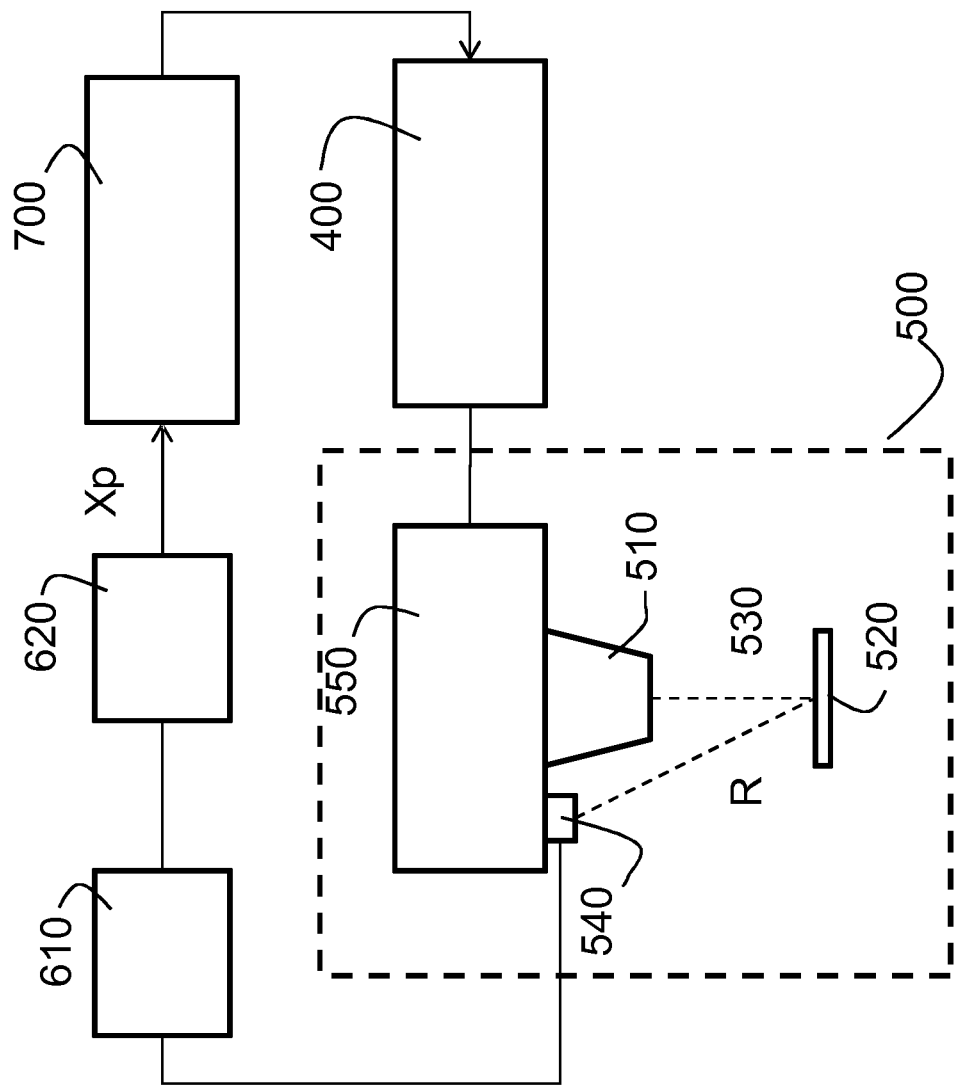
FIG. 1 is a perspective view of a machining system that implements the method according to the invention.

FIG. 1 is a principle block diagram of a laser machine provided by way of example suited to implementing the method according to the invention, where designated by 510 is a laser machining head, for example for welding or cutting operations, which emits a welding or cutting laser beam 530 towards a workpiece 520. The head 510 is mounted mobile so as to operate on a plurality of axes through a system of actuators 550. Said system of actuators 550 comprises actuators for displacing the machining head 510 along the axes and likewise comprises actuators for regulating process parameters. Said laser machining head 510 bears an optical sensor 540 for receiving a radiation R reflected during the process, i.e., during machining on the piece 520, for example the weld pool. The signal of the optical sensor 540 is amplified via an amplifier 610 and acquired via an acquisition card 620, for example an analog-to-digital converter, for generating a process signal Xp, which is sent to a processing system 700, for example a personal computer, or other computer or system of processors. The process signal Xp is substantially a signal that is emitted during normal machining, for example with the machine in non-supervised conditions, i.e., in the absence of an operator who supervises the machining quality. The processing system 700 is suited for real-time driving, through a module 400 for controlling the machine actuators, of the system of actuators 550. The processing system 700 carries out said control as a function of the settings and machining programs to be executed by the machine according to control criteria, in themselves known, of numeric-control machines and machining robots. In said context, the processing system 700 also supplies, among other things, power values of the laser beam, pressure values of cutting/welding operations, and also standoff-regulation values, such as, possibly, values of the position of the focal point of the lens on the sheet of metal. By "standoff" is meant the distance, for example of the tool centre point (TCP) from the sheet of metal. The standoff must be controlled at known values, for example, throughout the cutting/welding process. According to an important aspect of the invention, the processing system 700 is configured for making real-time regulation or correction of the technological parameters of machining, in particular laser cutting or welding, on the actuator-control module 400 on the basis of the process signal Xp and on the basis of the information on the process quality derived from said process signal Xp.

Figure 2:
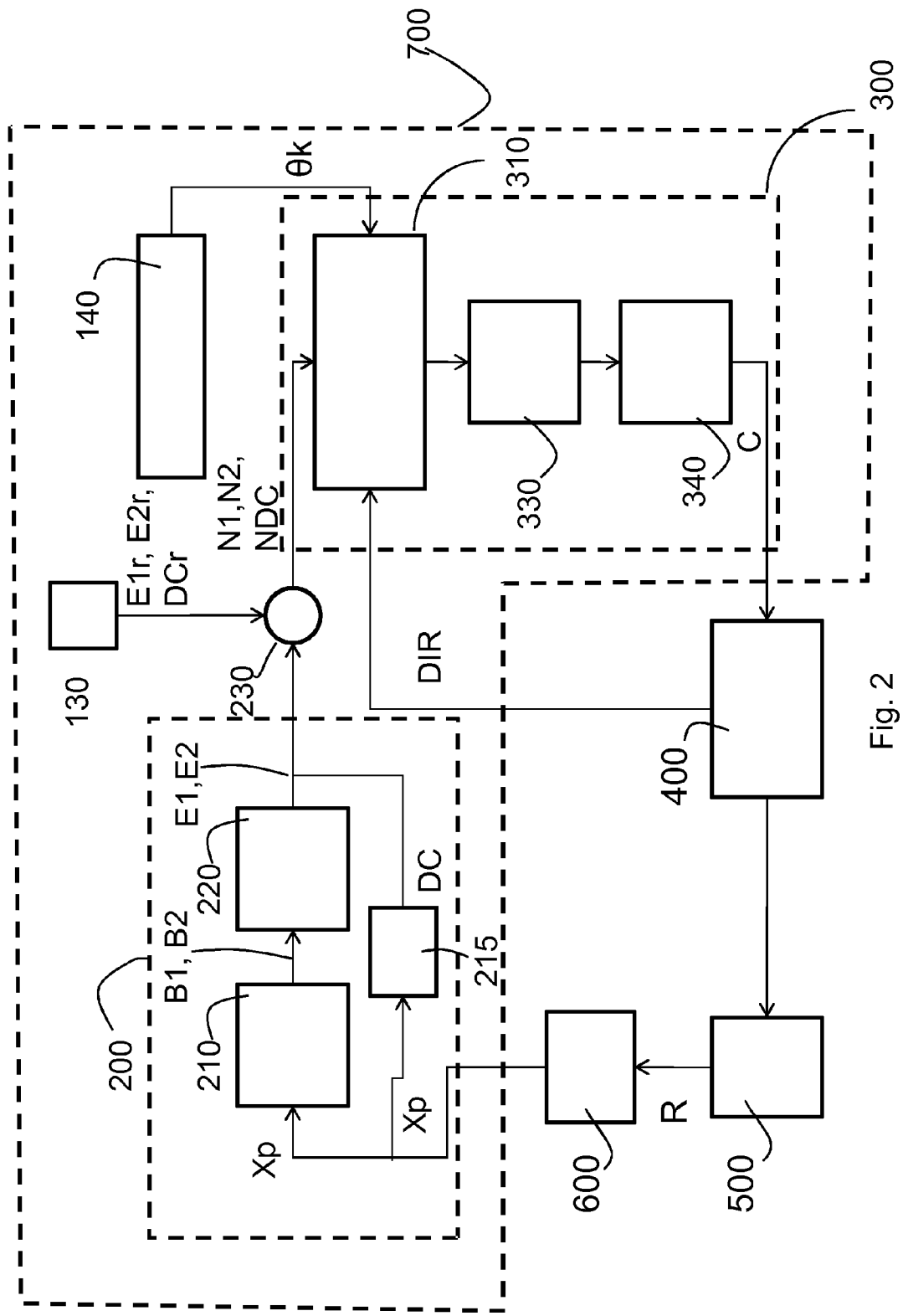
FIG. 2 is a block diagram representing the method according to the invention.

FIG. 2 is a block diagram representing the method according to the invention.

Block 500 represents the machining process, for example the process of laser cutting or welding. Said cutting or welding process is performed by a laser machine 400 like the one described with reference to FIG. 1. Block 600 represents an operation of real-time acquisition of the signal representing the quality of the cutting/welding process, which can use, for example, the modules 610 and 620 of FIG. 1. Said operation 600 hence includes setting an optical sensor, such as for example the sensor 540, in the vicinity of the laser-machining process for detecting the radiation R reflected during the laser-machining process. The signal of said optical sensor 540 representing the value of intensity of reflected radiation R, before being transferred to the processing system 700, is amplified and possibly converted to obtain the process signal Xp, i.e., a temporal series of values of intensity of reflected radiation acquired at given instants.

Said process signal Xp, i.e., the values of reflected radiation generated during the laser cutting/welding operation, is acquired because it can in general undergo processing to obtain information representing the quality of the process 500.

For this purpose, in a preliminary step, the values of reflected radiation generated during the laser cutting/welding operation can be filtered, for example via a low-pass filter, and analysed in a time-frequency representation, which can then undergo decomposition for identifying frequency bands of interest. Two significant frequency bands B1 and B2 are identified in this way, i.e., frequency intervals of the spectrum of the process signal Xp around two specific frequencies, designated here by F1 and F2, which are considered as representative of the quality of the process. Said bands can have an amplitude, for example, of a few hertz, around said frequencies F1 and F2. Said significant frequencies F1 and F2 are identified by seeking frequency bands in which the energy varies as the machining quality varies during the laser, process, for example the bands that present the greatest variation. It will on the other hand emerge clearly from the sequel of the present description that the monitoring method described herein operates also in the presence of a selection of suboptimal frequency bands B1 and B2. Said significant frequencies F1 and F2 are preferably frequencies of the laser-machining process that fall in a frequency range that can be acquired in an industrial context. By way of example, said values are of the order of a few kilohertz. The operations of search for significant frequencies just described are carried out in general in steps of analysis different from the machining steps, and the frequency values F1 and F2 are stored in the processing module 700 for use with the process proposed. The identification of the significant frequency values F1 and F2, in general, can be calculated just once, for example as in-factory setting, the monitoring method according to the invention not necessarily requiring calculation of the time-frequency distribution whenever a certain machining operation is being executed, but only requiring filtering, for example band-pass filtering, at the frequencies F1 and F2, the values thereof being already known beforehand.

The bands B1 and B2 of the process signal Xp at said frequencies F1 and F2, together with a d.c. voltage component DC of said process signal Xp from the sensor 540 and with the machining direction, for example the cutting direction, DIR, are used for the quality analysis. The d.c. voltage component DC of the process signal Xp can be obtained via a filtering operation. The method proposed hence preferably envisages execution of an operation of extraction of significant energies 200 from the process signal Xp, which comprises proceeding preliminarily to a filtering of the process signal Xp, for example a low-pass filtering. Next, in a step 210, two band-pass filterings are applied to obtain the two bands B1 and B2 corresponding to the significant frequencies F1 and F2, in this way selecting the bands, or rather the bandwidths, for said significant frequencies F1 and F2. There are then calculated, in a step 220 energies E1 and E2 for said bands B1 and B2 that correspond to the significant frequencies F1 and F2. The energies E1 and E2 are calculated using the formula for the calculation of the energy of a signal in the time domain. Designating by $x_L^{BPi}$ the generic signal in the time domain, where BPi is the respective band of the signal, the corresponding energy $E_L^{BPi}$ is $$E_{x_L^{BPi}} = \int_{-\infty}^{\infty} |x_L^{BPi}(t)|^2 dt$$

The acquisition 600 and the subsequent processing of the process signal Xp, in steps 210 and 220 are carried out at given instants in a constant and deterministic time interval (real-time). By way of example, during a deterministic time interval, which can preferably be of the order of tens of milliseconds, a value is acquired, and during said time interval monitoring of the quality and possible correction of the technological parameters is performed.

Moreover envisaged is association of each acquisition operation 600 to the particular geometrical position of the axes of the machine, and hence to points of the machining path. This is preferably carried out by the machine interpolator (not illustrated in FIGS. 1 and 2). Real-time servo-control structures for laser machines that comprise machine interpolators and servo control of actuators are in general known and will not be discussed in detail herein.

Before starting up the mode of analysis of the machining process, it is envisaged to obtain reference parameters for the reference signal Xr, which is a process signal regarding a reference machining, in particular of a desired or given quality. To create said reference signal Xr it is envisaged to perform a standard or reference machining, for example it is envisaged to cut a given icon, with the desired or given machining quality. The reference signal Xr is obtained for each machining—namely, it is specific for a certain material, thickness, value of focal length, and other parameters that define a certain type of machining of which it is desired to monitor the quality—and provides reference parameters, such as threshold energies, or reference energies E1r and E2r, for the frequencies F1 and F2, as well as a d.c. reference DCr, which are stored in a machine technological database.

It is then envisaged to compare the energies of the process signal Xp with the energies of the reference signal Xr stored in order to regulate it with respect to a given quality reference. In particular, said comparison comprises normalizing in a divider 230 the energies E1 and E2 and the d.c. voltage component DC of the signal of the sensor Xp, the latter being obtained via a module 215, which carries out, for example, a simple filtering operation with respect to the reference thresholds that are calculated during acquisition of the reference signal Xr; i.e., the normalized quantities E1/E1r, E2/E2r, DC/DCr are obtained, which are designated in FIG. 2 as normalized signals N1, N2 and NDC, respectively.

The normalized signals N1, N2 and NDC, together with the information on the direction DIR of the process signal Xp, lie at the basis of quality analysis.

Even though it may in general be possible to operate without information on the direction DIR, said information on the direction DIR could be important to take into account the possible asymmetries and aberrations of the process, which are normally present in real systems and processes.

The values of process signals Xp acquired in a series of instants fixed, for example, as has been said, on the basis of the deterministic time interval defining the real time, for example of the order of tens of milliseconds, are normalized as described above, and said normalized signals, N1, N2, NDC, DIR, are arranged in matrices so that they will constitute observations x of data of the statistical models of a procedure 300 of analysis of the machining process.

Figure 4:
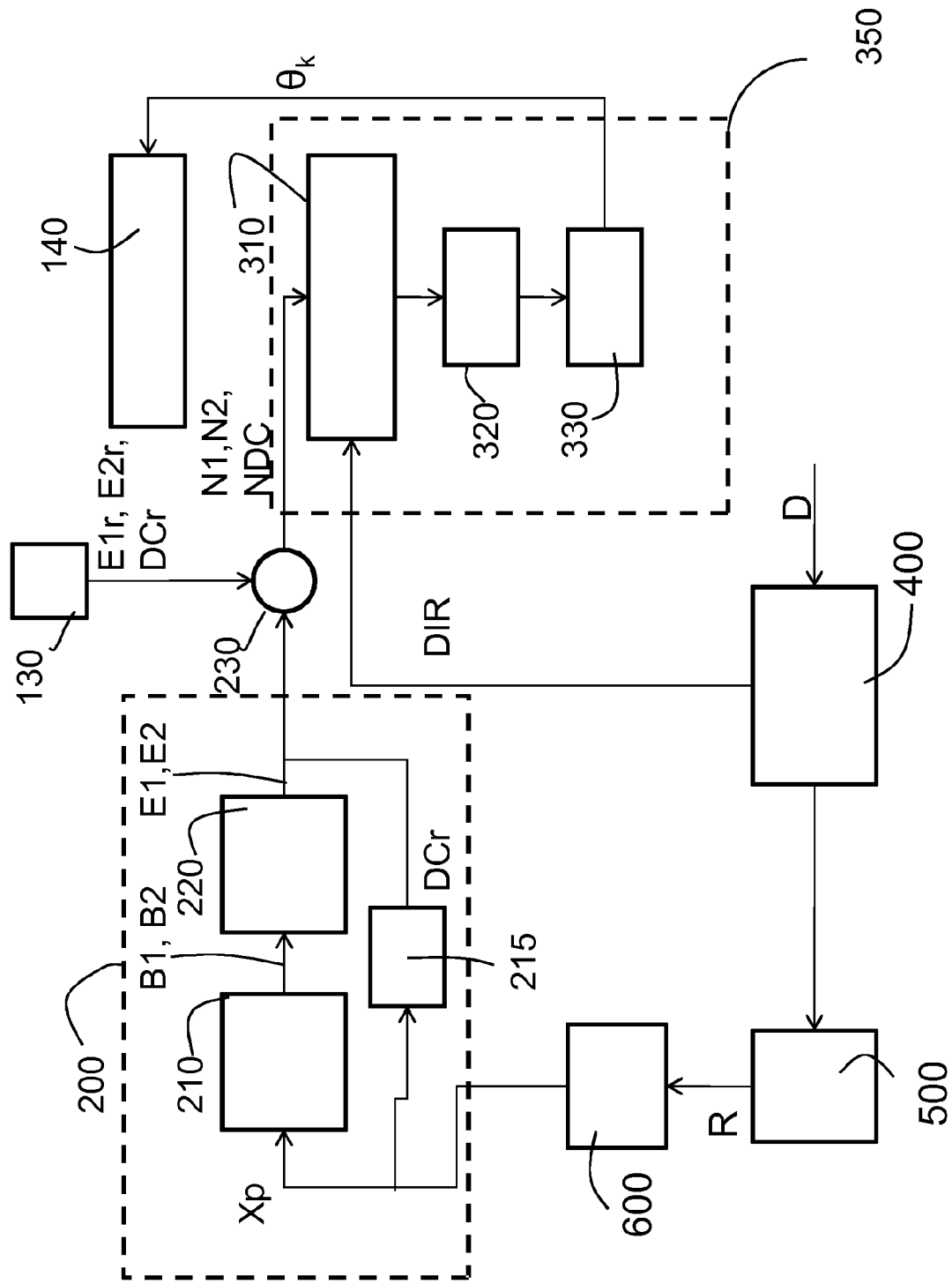
FIG. 4 represents a further step regarding the method according to the invention.

In this regard, in FIG. 2 designated by 140 is a memory module, for example located in the processing module 700 that controls the machining process, which stores sets of statistical parameters ($\mu_k$, $\Sigma_k$, $\Delta_k$) that define each trained model $\theta_k$, where $\mu_k$ is a mean, $\Sigma_k$ a covariance matrix, and $\Delta_k$ a transition matrix, and are obtained during a training step of the model, illustrated more clearly in what follows with reference to FIG. 4. They are the coefficients of statistical equations that identify the models for the various machining conditions, which can correspond to states of machining defect, states of good machining, or also other states of the machine, as exemplified hereinafter with reference to the optical diagnostics.

The process of quality analysis 300 comprises establishing to which given class, or model, each observation x of data belongs, i.e. is member, in the present example x is the set of four data or data matrix N1, N2, NDC, DIR.

In this context, in a step 310 a calculation of probability, in particular an d-dimensional Gaussian probability-density function, is made via an equation that has as constants said statistical parameters ($\mu_k$, $\Sigma_k$, $\Delta_k$) of the model $\theta_k$ obtained via the training step and available from the memory 140, and as variables said observations x, i.e., the normalized signals N1, N2 and NDC, and the value of machining direction DIR acquired at a certain instant, which are arranged in a 2×2 matrix of the normalized quantities having on the first row the normalized energies N1 and N2 and on the second row the normalized d.c. component NDC and the machining direction DIR $$x = \begin{bmatrix} N1 & N2 \\ NDC & DIR \end{bmatrix}$$

In various embodiments, the matrix of the normalized quantities can also contain functions of the normalized quantities N1, N2, NDC, and DIR.

The probability equation, as has been mentioned, is defined by the d-dimensional Gaussian probability-density function g (said dimension d being 2 in the case of the matrix of the observations x just described), for each data observation, given by the following equation $$g(\mu_K, \Sigma_K) = \frac{1}{\sqrt[d]{2\pi} \sqrt{det(\Sigma_K)}} e^{-\frac{1}{2}(x-\mu_K)^T \Sigma_K^{-1}(x-\mu_K)}$$

where x is the instantaneous observation derived at a certain instant by acquiring the process signal Xp, i.e., the matrix described above, while $\mu$ is a vector of the means, and $\Sigma$ is the covariance matrix. The statistical quantities $\mu$ and $\Sigma$ of the generic trained model $\theta$ are constants of the equation representing the d-dimensional Gaussian probability-density function, which is applied separately to each of the different models $\theta_k$, generating as many probability densities as are the models $\theta_k$ to which the probability that the observation x acquired at a certain instant belongs is to be evaluated.

Since the probability is maximum in the case where the observation x belongs to a given class or model $\theta_k$, then, in a defect-identification step 330, each probability-density datum is classified. In particular, step 330 operates according to the principle of Bayesian decision rules $$X \in q_k \text{ if } P(q_k|X,\Theta) \geq P(q_j|X,\Theta), \forall j \neq k$$

Said general formula indicates that, starting from a set of classes $q_k$ (corresponding to the models $\theta_k$), characterized by a known set of parameters identified as model $\Theta$, an observation, defined in general as X, belongs to one said class $q_k$ if its a posteriori probability is maximum; i.e., an observation X belongs to a given class $q_k$ if it is verified that the probability of it belonging to the k-th class is greater than the probability of it belonging to the j-th class.

The Bayes law that uses the a posteriori probability is $$P(q_k|X,\Theta) = \frac{p(X|q_k,\Theta)P(q_k|\Theta)}{p(X|\Theta)}$$

Two vectors belong to the same class if they are equiprobable. This occurs if the probability $P(X|\Theta)$ is constant. This happen if the probability $P(q_k|X, \Theta)$ is proportional to $p(X|q_k, \Theta) P(q_k|\Theta)$ $$P(q_k|X,\Theta) \propto p(X|q_k,\Theta)P(q_k|\Theta), \forall k$$

Executing the operations in logarithmic form $$\log P(q_k|X,\Theta) \propto \log p(X|q_k,\Theta) + \log P(q_k|\Theta)$$

calculation of logarithmic maximum likelihood, log $P(q_k|X, \Theta)$, is hence made.

This enables (step 330) identification of the particular state of the machining process, identified by the values of the process signal Xp at a certain instant, with respect to the models $\theta_k$ that represent the states of defect of machining and of good machining and hence identify whether the quality of machining is good or bad. In the case where a defect is identified, a cause of the defect D is moreover identified. Said cause of defect D is supplied to a module for regulating the technological parameters 340, which controls the actuator-control module 400.

It is hence possible to carry out control of the machining process and correction of any possible defects via real-time regulation of the technological parameters of laser machining, in particular cutting or welding.

Once the particular state of the machining process and the cause of a possible defectiveness D of the process 500 are identified, the next step is automatic correction of the technological machining parameters via the module for regulating the technological parameters 340, which issues correction instructions C. In the presence of defectiveness of the process, the next step is correction of the parameter, for example laser pressure or laser power, or the value of focal length, or the speed of the axes, or the standoff, which generates the low cutting or welding quality level.

The correction operation is performed, for example, in successive steps and continues iteration of said steps for the number of times necessary for recovering the desired quality of the machining process. In the presence of simultaneous identification of different causes of defect D, first the technological parameter the influence of which is the highest is corrected and then the other parameters. This is equivalent to saying that the probability study described above, in particular with respect to the step 330 of identification with bayesian classification also furnishes the priority of intervention on the technological corrections to be made. In this case, in fact, it is envisaged, for example, to calculate the probability for all the models. The correction the corresponding defect of which is the one that yields the highest probability is made, but, in the case where the correction already made corresponds to the highest possible probability, the second highest probability is considered.

Preferably, the correction of the defects is performed considering one defect at a time even when a number of defects are present together. Then, when the first correction is terminated, the second is started. In general, it may be considered that there does not exist a single set of technological parameters that enable the desired quality to be achieved, but there exist various sets; consequently, the method preferably operates to obtain a quality constantly equal to the desired one, rather than a set of chosen parameters.

According to the cause of defect D identified during the machining process a word is sent, for example a 16-bit word, to the module for regulating the technological parameters 400, which is a numeric control module of the machine, which, for example via the corresponding actuators for regulating process parameters of the system of actuators 550, regulates the technological parameters to improve the machining quality. Regulation of the technological parameters of laser cutting is performed for example in such a way that the cutting quality is constantly good during the process. The parameters that are regulated during the cutting process are, for example:

focal distance;
cutting speed;
cutting pressure;
laser power; and
cutting standoff.

The regulation of the technological parameters through the comparison of a signal with trained models may envisage not only correction of the process parameters, but also diagnostics of the optical system through which the laser beam is conveyed onto the workpiece.

For example, in the case where it is desired to check whether a failure of the optical system affects the method of identification of the machining defects, there may be provided in the area where machining is carried out, outside the machining paths, but in a point that can be reached by the machining tool, a radiation source, for example a LED, suited for emitting a radiation towards the optical sensor 540 in the machining head 510. The source, for example the laser radiation of the machine, is turned off when the head 540 reaches the position of the LED so that the optical sensor 540 receives a light radiation with known characteristics that are, preferably, similar to those of a machining process, said radiation not being, however, affected by possible defects introduced by the optical system, and enables a procedure 300 of analysis to be carried out such as the one described in FIG. 2, for a signal that originates downstream of the optical system. In said conditions, if the operation even so encounters a state of defect, there is a defect in the optical system. More specifically, it is envisaged to train a respective model for recognizing one or more specific defects of the optical system.

Hence, according to a further aspect of the invention, the plurality of statistical models $\theta_k$ identifying respective states of the machining process 500 comprises at least one model identifying a state of the machining process trained for recognizing one or more specific defects of the optical system of the laser machine, in which the process signal Xp is determined by a source different from a machining laser of the laser machine, for carrying out diagnostics on the optical system of the machine. It will be appreciated that said model for recognition of the condition can be trained and used autonomously also outside of the process of monitoring of machining defects to implement a function of monitoring of just the defects of the optical system.

Figure 3:
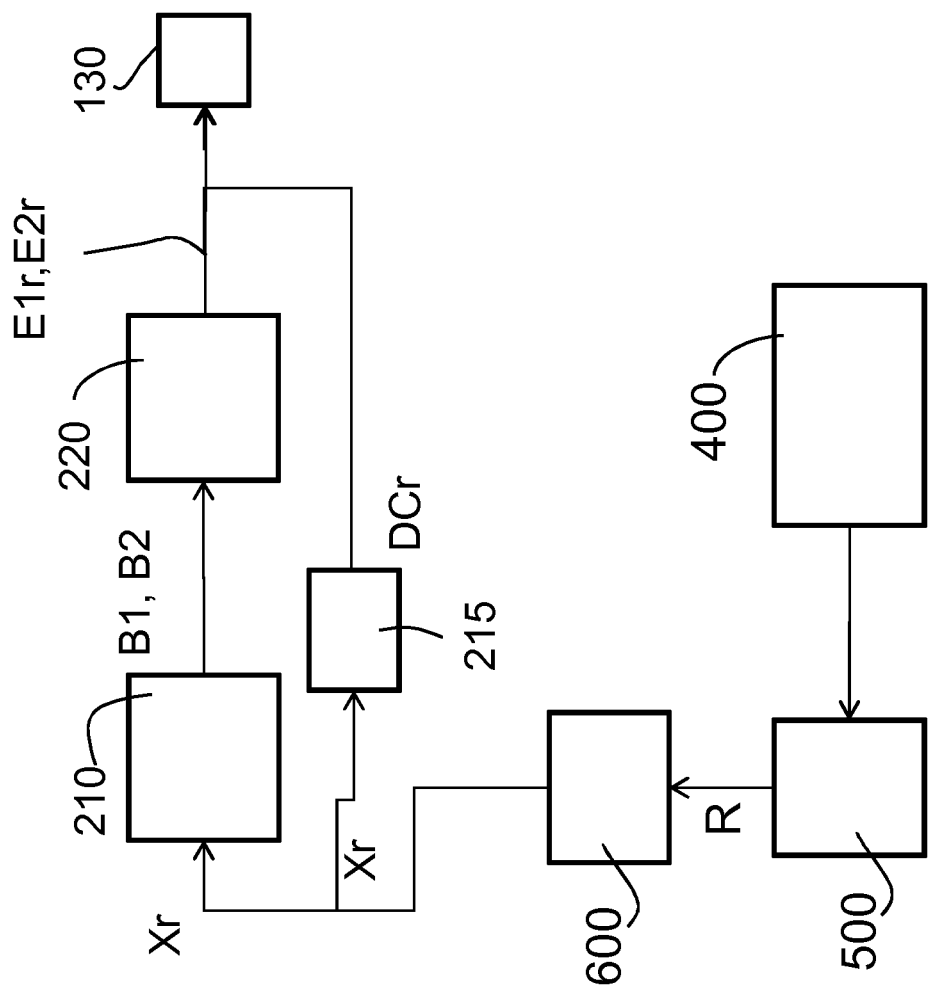
FIG. 3 represents a step regarding the method according to the invention.

FIG. 3 illustrates processing of the reference signal Xr, to which the operation of extraction of significant energies 200 is applied, by applying in step 210 two band-pass filterings in the two bands B1 and B2 corresponding to the significant frequencies F1 and F2, thus obtaining the reference signal Xr in said two bands B1 and B2. Then, in a step 120, the reference energies E1$r$ and E2$r$ are calculated for said bands B1 and B2. The reference energies E1$r$ and E2$r$ represent, as has been said, thresholds of the signal that are stored in a machine technological database 130. A d.c. reference signal DCr is also acquired from the reference signal Xr, via the filtering operation carried out in block 215, and stored in the machine technological database 130. As has been said, said operation is carried out, for example, once at the start of machining, and the thresholds obtained from the reference signal Xr are used for monitoring the quality during machining, without it being necessary, for example, to supervise said monitoring.

FIG. 4 illustrates a scheme that represents in detail the training step for constructing the statistical models $\theta_k$.

Said operation of construction of statistical models envisages off-line calculation of the coefficients of statistical equations that identify the models of the various conditions of machining, cutting/welding, of the laser machine. Training of the models is performed through a campaign of tests for data collection. In the data collection acquisitions are collected for the various modes of machining, i.e., cutting/welding, of the laser machine, namely, for example, data collections regarding:

cutting/welding with a good result with different parameters, for example of pressure, power, focal distance;
cutting/welding with a poor result on account of the high focal position;
cutting/welding with a poor result on account of the low focal position;
cutting/welding with a poor result on account of a high cutting/welding pressure;
cutting/welding with a poor result on account of a low cutting/welding pressure;
cutting/welding with a poor result on account of a high cutting/welding speed;
cutting/welding with a poor result on account of a low cutting/welding speed;
cutting/welding with a poor result on account of a high laser power;
cutting/welding with a poor result on account of a low laser power;

cutting/welding with a poor result following upon of an erroneous standoff position during the cutting/welding process.

Each of said data collections determines a respective statistical model $\theta_k$, which identifies a corresponding k-th state of the cutting/welding process.

If, for example, the collection data are the ten exemplified above, at the end of training ten statistical models $\theta_k$ are obtained:

1. good cutting/welding model
2. poor cutting/welding model—high focal position
3. poor cutting/welding model—low focal position
4. poor cutting/welding model—high cutting/welding pressure
5. poor cutting/welding model—low cutting/welding pressure
6. poor cutting/welding model—high cutting/welding speed
7. poor cutting/welding model—low cutting/welding speed
8. poor cutting/welding model—high laser power
9. poor cutting/welding model—low laser power
10. poor cutting/welding model—erroneous standoff position during the cutting/welding process.

Each of said trained models $\theta_k$, as may be seen, contains statistical values, associated to a respective cause of defect D: high focal position, low focal position, high cutting/welding speed, low cutting/welding speed, low cutting/welding pressure, high cutting/welding pressure, high laser power, low laser power, erroneous standoff position, in addition to good cutting/welding, i.e., absence of defect or no cause of defect. It is clear that said list is not exhaustive, but depends upon the causes of defect D that it is possible to identify and upon how it is possible to classify said causes of defect D. The information on the cause of defect D may possibly not be purely qualitative, or may identify only the machining parameter on which to intervene, but may also contain values or ranges of parameters, for example of laser pressure, cutting speed, power, that are associated to the cause of defect and can possibly be processed.

The trained models $\theta_k$ are constituted, as already mentioned previously, by the following statistical quantities:

a. mean $\mu_k$;
b. covariance matrix $\Sigma_k$; and
c. transition matrix $\Delta_k$.

The transition matrix $\Delta_k$ expresses the probability of passing from a given state into another state. By way of example, in the application described herein, the process state of high focal position is represented by a given observation x with four different values, the normalized signals N1, N2, NDC and the direction DIR. The formula for calculation of Gaussian probability takes into account the mean and the covariance. However, it is envisaged to link said four different values via a weighted relation according to the defect. Said weighted relation corresponds to the transition matrix $\Delta_k$. In other words, also the probability of transition from one datum of the observation x to another datum of the same observation is thus obtained. If the four data of an observation x belong to one and the same model $\theta_k$, they maximize also the probability of transition. In other words, during the training step in a certain data collection an observation with excessively low values of probability of transition can be reasonably rejected as spurious data. The transition matrix, the mean, and the covariance are supplied by the off-line training procedure, which is executed by carrying out part of the operations described hereinafter.

It should be noted that the construction of statistical models that envisage off-line calculation of the coefficients of statistical equations that identify the models of the various conditions of machining, cutting/welding, of the machine, uses the same normalized signals N1, N2, and NDC and the value of machining direction DIR, said signals being acquired, however, during the data-collection tests, then using a training procedure 350, comprising the steps 310, 330 described previously of the machining process for training the models, but exploiting for this purpose also the Viterbi procedure.

The training method 350 in fact envisages, for training a specific model $\theta_k$, for example high focal position, for a certain sample defined by certain parameters, for example cutting on a given material and for a given thickness, carrying out a plurality of machining operations, for example obtaining the same shape in each of these machining operations, that are affected by said defect of high focal position and acquiring at given instants the values of process signals Xp thereof, which are in this case dedicated to training. The equation of step 310 is used for constructing, in particular via successive steps corresponding to each machining operation in said plurality of machining operations, a probability density of the respective observations x, in particular for each instant. In said context, in a step 320, an operation of Gaussian clustering is performed on the observations of the data collections that are acquired subsequently, by following a Viterbi maximization convergence procedure, which produces a maximum probability. Said Viterbi procedure, in itself known, envisages correction of the parameters obtained to the previous step, if the probability is different from the one obtained in the previous step.

Hence, the calculation of the probability density for the training step 350 is, in step 310, a calculation made according to the rule of Gaussian mixtures; in step 320, the Viterbi procedure maximizes the probability and updates prior probabilities, i.e., initial probability values; whilst, in the next step 330 of identification of the defect the classification according to the Bayesian laws can be adopted as probabilistic choice criterion in regard to the Viterbi procedure. For the training step 350 the Viterbi-EM procedure can hence be used, which combines said three operations 310, 320, 330.

The model $\theta_k$ defined at the end of a data collection for a certain cause of defect D is stored in the memory 140 for subsequent use in the machining step. Of course, the memory 140 can be used for storing the intermediate values while the model $\theta_k$ is being constructed and trained.

Of course, the details of construction and the embodiments may vary widely with respect to what is described and illustrated herein, without thereby departing from the scope of the present invention, as defined in the ensuing claims.

The invention claimed is:

1. A method for monitoring the quality of laser-machining processes, wherein the method comprises the operations of:
acquiring via sensor means, a machining-process signal (Xp) and calculating from said signal representing the process (Xp) parameters (E1, E2, DC) representing the machining quality during the laser-machining process;
making available corresponding reference parameters (E1r, E2r, DCr) representing a given machining quality, calculated from a process reference signal (Xr) acquired via said sensor means, and
wherein said method further comprises the operations of:
comparing said parameters (E1, E2, DC) representing the machining quality with said reference parameters (E1r, E2r, DCr) representing a given machining quality to obtain a set of regulated process parameters (N1, N2, NDC);

making available a plurality of statistical models ($\theta_k$) that identify respective states of the machining process, said states including states of defect (D); and executing in real time an operation of recognition of membership for a set of process observations (x; N1, N2, NDC, DIR) acquired in real time which includes said set of regulated process parameters (N1, N2, NDC) with respect to one or more of said plurality of statistical models ($\theta_k$) that identify states of the machining process, said recognition operation including identification of one or more causes of defect (D) as a function of the states recognized in said recognition operation.

2. The method according to claim 1, wherein said recognition operation includes calculating data on the probability of said set of process observations (x) belonging to a state and classifying each probability datum (P) according to Bayes decision rules for identifying said state and a corresponding cause of defect (D).

3. The method according to claim 2, wherein said method comprises calculating said probability data according to a Gaussian-mixture calculation rule.

4. The method according to claim 1, wherein said operation of calculating, from said signal representing the process (Xp) or from said reference signal (Xr), respective parameters (E1, E2, DC) representing the machining quality during the laser-machining process and reference parameters (E1r, E2r, DCr) representing a given machining quality, comprises selecting from between said process signal (Xp) and said reference signal (Xr), respective frequency bands (B1, B2) for specific frequencies (F1, F2) of the process signal (Xp) or reference signal (Xr), and calculating respective energy values (E1, E2, E1r, E2r) for the process signal (Xp) or reference signal (Xr) for said respective bands (B1, B2).

5. The method according to claim 4, wherein said operation of comparing said parameters (E1, E2, DC) representing the machining quality with said reference parameters (E1r, E2r, DCr) representing a given machining quality to obtain a set of regulated process parameters (N1, N2, NDC) includes normalizing said energy values (E1, E2) of the bands (B1, B2) of the process signal (Xp) with the energy values (E1r, E2r) of the corresponding bands (B1, B2) of the reference signal (Xr).

6. The method according to claim 1, wherein said set of process observations (x; N1, N2, NDC, DIR) acquired in real time includes a normalized dc-component value (NDC) of the process signal (Xp) and a value of machining direction (DIR).

7. The method according to claim 1, wherein said operation of making available a plurality of statistical models ($\theta_k$) that identify respective states of the machining process, said states including states of defect (D), comprises preliminary execution of a step of construction and training of said statistical models ($\theta_k$) and storage of data representing said statistical models ($\theta_k$).

8. The method according to claim 7, wherein said step of construction of said statistical models ($\theta_k$) comprises a step of data collection that includes collecting process signals (Xp) regarding causes of defect (D) and calculating corresponding sets of statistical parameters.

9. The method according to claim 1, wherein said operation of calculating said sets of statistical parameters includes employing a Viterbi procedure for maximizing the probability and using a Bayes classification as probabilistic choice criterion for constructing said statistical model ($\theta_k$).

10. The method according to claim 8, wherein said recognition operation includes applying a Viterbi-EM procedure for calculating said sets of statistical parameters.

11. The method according to claim 7, wherein said plurality of statistical models ($\theta_k$) that identify respective states of the machining process include at least one model identifying a state of the machining process trained for recognizing one or more specific defects of the optical system of the laser machine, in which the process signal (Xp) is determined by a source different from a machining laser of the laser machine, in order to carry out a diagnostics on said optical system of the machine.

12. The method according to claim 1, wherein said process reference signal (Xr) acquired via said sensor means is acquired in a standard or reference machining step.

13. The method according to claim 1, wherein the method comprises carrying out a regulation of technological parameters for making an automatic correction in real time of one or more of said technological machining parameters as a function of one or more causes of defect (D) identified.

14. The method according to claim 1, wherein said correction operation includes successive steps of correction of one or more of said technological parameters iterated until the desired quality of the process is reached.

15. The method according to claim 1, wherein the method comprises obtaining, from said identification step with Bayesian classification, priorities of intervention on the corrections to be made.

16. The method according to claim 13, wherein said technological parameters include one or more from among:
focal distance;
cutting or welding speed;
cutting or welding pressure;
laser power;
cutting or welding standoff.

17. A system for monitoring the quality of laser-machining processes, wherein the system comprises
a laser machine, and
one or more modules that operate a method for monitoring the quality of laser-machining processes, said method comprising:
acquiring, via sensor means, a machining-process signal (Xp) and calculating from said signal representing the process (Xp) parameters (E1, E2, DC) representing the machining quality during the laser-machining process; and
making available corresponding reference parameters (E1r, E2r, DCr) representing a given machining quality, calculated from a process reference signal (Xr) acquired via said sensor means,
wherein said method further comprises the operations of:
comparing said parameters (E1, E2, DC) representing the machining quality with said reference parameters (E1r, E2r, DCr) representing a given machining quality to obtain a set of regulated process parameters (N1, N2, NDC);
making available a plurality of statistical models ($\theta_k$) that identify respective states of the machining process said states including states of defect (D); and
executing in real time an operation of recognition of membership for a set of process observations (x; N1, N2, NDC, DIR) acquired in real time which includes said set of regulated process parameters (N1, N2, NDC) with respect to one or more of said plurality of statistical models ($\theta_k$) that identify states of the machining process, said recognition operation including identification of one or more causes of defect (D) as a function of the states recognized in said recognition operation.

18. The system according to claim 17, wherein the system comprises an optical-sensor module configured for acquiring said signal representing the process (Xp) and said process reference signal (Xr) indicating a machining operation with a given quality.

19. The system according to claim 17, wherein the system comprises a processing module configured for executing said operation of recognition that a set of process observations (x) including said set of regulated signals (N1, N2, NDC) belongs to one or more of said statistical models ($\theta_k$) that identify states of the machining process, said processing module is configured for storing, in a memory module and reading from said memory module said statistical models ($\theta_k$) that identify states of the machining process.

20. The system according to claim 17, wherein said processing module is configured for issuing commands for corrections of said technological parameters to a actuator-control module of a laser machine.

21. A computer program product that can be directly loaded into the memory of a computer and includes portions of software code for implementing a method for monitoring the quality of laser-machining processes when the computer program product is run on a computer, wherein said method comprises:

a method for monitoring the quality of laser-machining processes, said method comprising:

acquiring, via sensor means, a machining-process signal (Xp) and calculating from said signal representing the process (Xp) parameters (E1, E2, DC) representing the machining quality during the laser-machining process;

making available corresponding reference parameters (E1r, E2r, DCr) representing a given machining quality calculated from a process reference signal (Xr) acquired via said sensor means, and wherein said method further comprises the operations of:

comparing said parameters (E1, E2, DC) representing the machining quality with said reference parameters (E1r, E2r, DCr) representing a given machining quality to obtain a set of regulated process parameters (N1, N2, NDC);

making available a plurality of statistical models ($\theta_k$) that identify respective states of the machining process, said states including states of defect (D); and executing in real time an operation of recognition of membership for a set of process observations (x; N1, N2, NDC, DIR) acquired in real time which includes said set of regulated process parameters (N1, N2, NDC) with respect to one or more of said plurality of statistical models ($\theta_k$) that identify states of the machining process, said recognition operation including identification of one or more causes of defect (D) as a function of the states recognized in said recognition operation.

22. The method for monitoring the quality of laser-machining processes according to claim 1, wherein the laser-machining processes are laser-cutting or laser-welding processes.

23. The system for monitoring the quality of laser-machining processes according to claim 17, wherein the laser-machining processes are laser-cutting or laser-welding processes.

24. The computer program product according to claim 21, wherein the laser-machining processes are laser-cutting or laser-welding processes.

25. The method for monitoring the quality of laser-machining processes according to claim 1, wherein the sensor means are optical sensors.

26. The system for monitoring the quality of laser-machining processes according to claim 17, wherein the sensor means are optical sensors.

27. The computer program product according to claim 21, wherein the sensor means are optical sensors.

28. The method according to claim 4, wherein said selecting comprises via filtering.

29. The method according to claim 8, wherein the statistical parameters comprise a mean ($\mu_k$), a covariance matrix ($\Sigma_k$), and a transition matrix ($\Delta_k$).

30. The method according to claim 12, wherein said machining step comprises a step of machining a standard or reference piece prior the acquisition of the process signal (Xp).

31. The system according to claim 20, wherein said commands are for carrying out cutting or welding operations.

* * * * *